(12) United States Patent
Tsuboi

(10) Patent No.: US 6,836,037 B1
(45) Date of Patent: Dec. 28, 2004

(54) MOTOR-ASSISTED DRIVE UNIT FOR MOTOR-ASSISTED VEHICLE

(75) Inventor: Masaharu Tsuboi, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/675,057

(22) Filed: Sep. 29, 2000

(30) Foreign Application Priority Data

Sep. 30, 1999 (JP) ............................................. 11-279925
Jun. 6, 2000 (JP) ....................................... 2000-169096

(51) Int. Cl.⁷ .......................... H02K 11/00; B62M 23/02
(52) U.S. Cl. ............ 310/68 R; 310/67 R; 310/DIG. 6; 180/65.8
(58) Field of Search ....................... 310/67 R, DIG. 6, 310/91, 51, 68 R, 90, 64; 180/65.1, 65.5, 65.8

(56) References Cited

U.S. PATENT DOCUMENTS

| 4,668,898 A | * | 5/1987 | Harms et al. ............... 310/227 |
| 5,444,314 A | * | 8/1995 | Okada ................... 310/40 MM |
| 5,691,584 A | | 11/1997 | Junji et al. |
| 5,826,675 A | | 10/1998 | Satoshi |
| 5,845,727 A | | 12/1998 | Junichiro et al. |
| 5,915,493 A | | 6/1999 | Hironori |
| 6,081,056 A | * | 6/2000 | Takagi et al. ............... 310/254 |
| 6,268,669 B1 | * | 7/2001 | Wakao et al. .......... 310/DIG. 6 |

FOREIGN PATENT DOCUMENTS

| EP | 0 846 614 A | | 6/1998 | |
| EP | 0 965 519 A | | 12/1999 | |
| EP | 0 980 821 A | | 2/2000 | |
| JP | 09009577 A | * | 1/1997 | .......... H02K/11/00 |
| JP | A115584 | | 1/1999 | |
| WO | WO 9733359 A1 | * | 9/1997 | .......... H02K/29/00 |
| WO | WO 9916654 A1 | * | 4/1999 | ............ B62D/5/04 |

* cited by examiner

*Primary Examiner*—Burton Mullins
(74) *Attorney, Agent, or Firm*—Birch, Stewart, Kolasch & Birch, LLP

(57) ABSTRACT

The motor-assisted drive unit includes motor as a power assist source housed in a casing, and a control board on which control devices of the motor are mounted. The control board is arranged in the casing so as to be substantially perpendicular to the motor shaft of the motor. At least part of the control board extends, as seen along the axial direction of the motor, to a position at which it is overlapped with the motor. Because part of the control board is overlapped with the motor, the size of the motor-assisted drive unit can be reduced. In addition, dead space in the interior space of the casing is minimized.

18 Claims, 11 Drawing Sheets

MOTOR-ASSISTED DRIVE UNIT FOR MOTOR-ASSISTED VEHICLE

BACKGROUND OF THE INVENTION

1. Field of the Invention

The present invention relates to a motor-assisted drive unit for a motor-assisted vehicle, and particularly to a motor-assisted drive unit for a motor-assisted vehicle in which an assist unit is small-sized.

2. Background Art

A conventional bicycle has been proposed that detects a manual drive torque, or leg-power, and biases a power assist source (DC motor) connected to a drive system in accordance with the detected leg-power in order to assist the leg-power. One example of a drive unit including such a power assist source is disclosed in Japanese Patent Laid-open No. Hei 11-5584. The drive unit is disposed at the back of a crank shaft and its area, wherein a controller casing for housing a controller including electronic parts (power transistor, CPU, and the like) for driving the motor, and a the controller casing projects downwardly from a motor casing for housing the motor.

The conventional drive unit, which includes the controller casing projecting downwardly from the motor casing, is undesirably large.

There is therefore a need for a drive unit to provide a motor-assisted drive unit for a motor-assisted vehicle which is small in size.

SUMMARY OF THE INVENTION

To achieve the above object and other objects, according to a first feature of the present invention, there is provided a motor-assisted drive unit for a motor-assisted vehicle, including a motor as a power assist source housed in a casing, including a control board on which control devices of the motor are mounted; wherein the control board is provided in the casing so as to be disposed in a direction substantially perpendicular to the motor shaft of the motor; and at least part of the control board extends, as seen along the axial direction of the motor, to a position at which it is overlapped with the motor.

With the above feature, since part of the control board is overlapped with the motor, as seen along the axial direction of the motor, the motor-assisted drive unit can be made as small in size as possible, and since the area of the control board extends to a position at which it is overlapped with the motor, the inner space of the casing can be efficiently used.

According to a second feature of the present invention, a CPU as one of the control devices of the motor is mounted on a portion, overlapped with the motor, of the control board, so as to project in a gap between the overlapped portion of the control board and the motor. According to this feature, it is possible to dispose a CPU having a relatively large mounting area in the conventional dead space.

According to a third feature of the present invention, there is provided a motor-assisted drive unit for a motor-assisted vehicle, including a motor as a power assist source housed in a casing, including a first control board and a second control board on each of which control devices of the motor are mounted; wherein the first and second control boards are disposed in the casing so as to extend in the direction nearly perpendicular to the motor shaft of the motor; and the second control board is overlapped, as seen along the axial direction of the motor, to part of the first control board.

According to the third feature, since the second control board is overlapped with part of the first control board, as seen from the axial direction of the motor, the motor-assisted drive unit can be made small in size. Further, control devices mounted on the first and second control boards can be efficiently disposed in consideration of the correlation between the control devices, and the first and second control boards can be disposed in the casing without occurrence of a dead space.

According to a fourth feature of the present invention, control devices, typically, a CPU, a capacitor, and a relay are mounted on the first control board, and a FET is mounted on the second control board. With this feature, the control devices having relatively small heat generation, such as the CPU, capacitor, and relay, are mounted on the first control board separate from the FET on the second control board, which has a relatively large heat generation. It is therefore possible to prevent the heat generated from the FET from being directly transferred to the control devices such as the CPU, capacitor, and relay.

According to a fifth feature of the present invention, the first control board is configured as a printed wiring board, and the second control board is configured as a light metal board. Also, according to a sixth feature of the present invention, the second control board is directly attached to the inner wall surface of the casing, and the first control board is disposed over the second control board with a gap disposed therebetween. According to these features, it is possible to easily transfer the heat, which is generated from the FET and the like mounted on the second control board, to the casing via the light metal board, and to minimize heat from affecting the first control board.

According to a seventh feature of the present invention, the control board is elastically supported on the casing; according to an eighth feature of the present invention, the control board is elastically supported by using a vibration-proof rubber disposed around a casing boss portion for rotatably supporting the motor shaft of the motor; and according to a ninth feature of the present invention, the vibration-proof rubber is compressed between the control board and a motor supporting portion of the casing. With these features, transmission of vibration to the control board is retarded, which stabilizes the operation of the electric parts mounted on the control board, thereby prolonging the service life of the electric parts.

According to a tenth feature of the present invention, the control devices of the motor are mounted on both surfaces of the control board; a semiconductor device and a board having a good thermal conductivity at least part of which is in contact with the semiconductor device are provided on the surface, on the casing side, of the control board; and the board having a good thermal conductivity is in contact with the casing. With this configuration, it is possible to effectively transfer heat generated from the semiconductor device by a simple, inexpensive structure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 4:
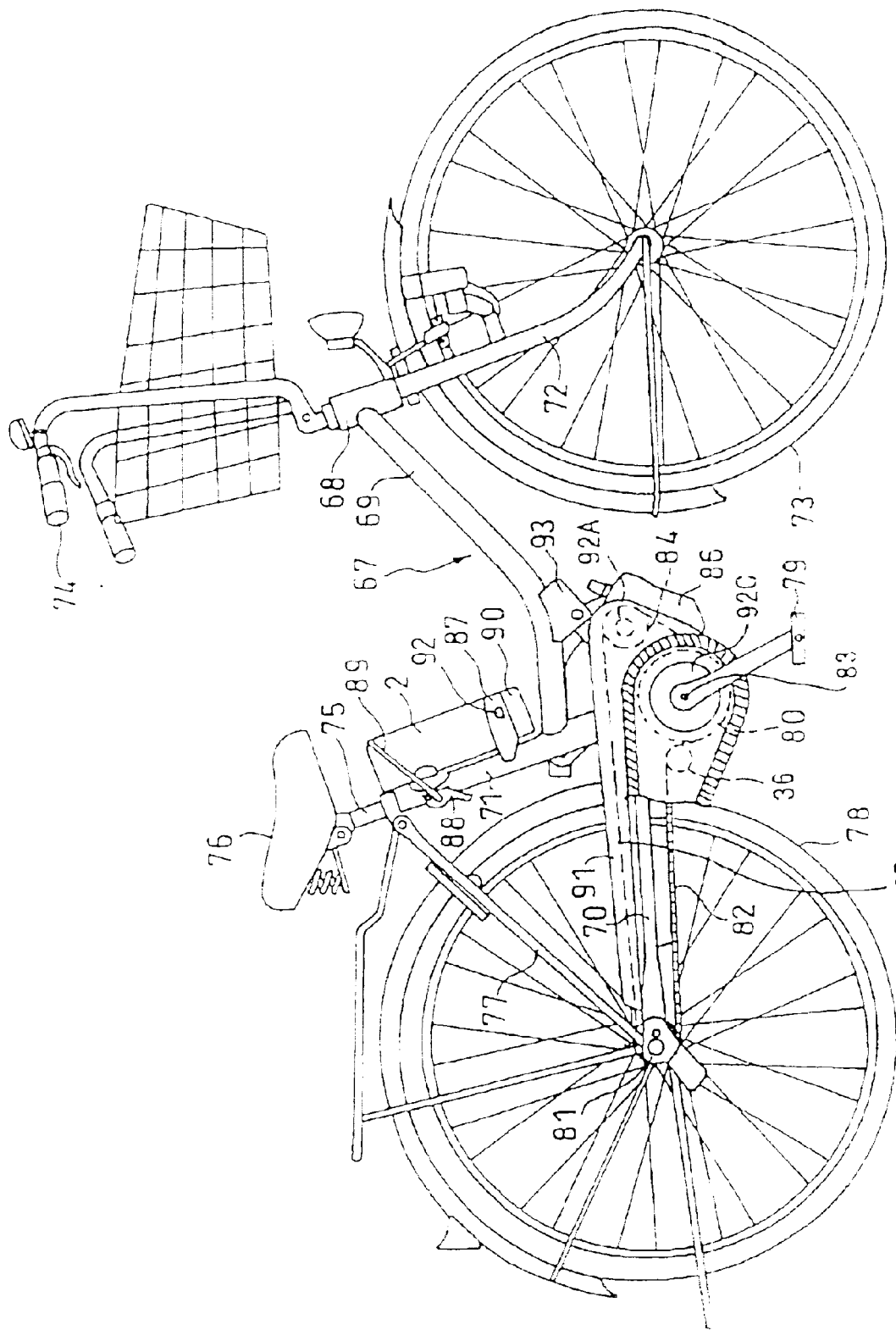
FIG. 4 is a side view of a motor-assisted vehicle in which a leg-power detector is assembled.

Hereinafter, the present invention will be described in detail with reference to the drawings. FIG. 4 is a side view of a motor-assisted bicycle having a small-sized motor-assisted drive unit according to the present invention. Referring to FIG. 4, a bicycle frame 67 includes a head pipe 68 positioned at a front portion of the bicycle, a down pipe 69 extending rearwardly and downwardly from the head pipe 68, and a seat post 71 fixed to the rear end of the down pipe 69 and raised upwardly, slightly rearwardly therefrom. A front fork 72 is steerably supported by the head pipe 68. A front wheel 73 is rotatably supported by the lower ends of the front fork 72, and a steering handlebar 74 is provided at the upper end of the front fork 72.

A rear drive wheel 78 is rotatably supported by the rear ends of a pair of right and left legs of a rear fork 70 extending rearwardly from the seat post 71. A pair of right and left stays 77 are connected to the rear ends of the rear fork 70, and the upper ends of the stays 77 are connected to the upper portion of the seat post 71. A supporting shaft 75, on the upper end of which a seat 76 is provided, is mounted to the seat post 71 so that the position of the seat 76 is adjustable in the vertical direction.

A supporting pipe (not shown in FIG. 4) extending in the lateral direction of the vehicular body is fixed to the lower end of the seat post 71. A crank shaft 83 passes through the supporting pipe and is supported by bearings. Pedals 79 to which a leg-power is to be applied by a driver are provided at the leading ends of cranks connected to the crank shaft 83. A drive sprocket 80, to which the rotation of the crank shaft 83 is transmitted via a power transmission, is provided on the crank shaft 83. The rotation of the drive sprocket 80 is transmitted to a driven sprocket 81 on the rear drive wheel side via a chain 82. A tensioner 36 for enlarging the winding angle of the chain 82 around the drive sprocket 80 and adjusting the tension of the chain 82 is provided behind the drive sprocket 80.

A motor-assisted drive unit 86 is mounted such that a portion thereof is connected to the seat post 71 via a bracket (not shown) and another portion thereof is suspended from the down pipe 69 via a bracket 93. The motor-assisted drive unit 86 is disposed in front of the crank shaft 83, and a motor-assisted drive sprocket 84 connected to an output shaft of the motor-assisted drive unit 86 is engaged with the above-described chain 82 in order to assist the drive of the drive sprocket 80.

A cover 91 for covering the chain 82 includes a cover 92A for covering the motor-assisted drive sprocket 84 portion, a cover 92B for covering the tension side of the chain 82, and a cover 92C for covering the drive sprocket 80 portion. These covers 92A, 92B and 92C are formed into one body. The chain cover 91 need not be painted the same color as a whole. For example, the cover 92C for covering the drive sprocket 80 portion and the cover 92B for covering the tension side of the chain 82 may be painted with a color different from that of the frame 67, and the cover 92A be preferably painted with the same color as that of the frame 67. In this painting scheme, the motor-assisted drive sprocket 84 portion can be made inconspicuous.

A battery holder 87 is fixed to the seat post 71, and a battery 2 for supplying a power to the motor-assisted drive unit 86 is removably supported by the battery holder 87. A band 89 for holding an upper portion of the battery 2 and a fixture 88 for mounting/dismounting the band 89 on the battery 2 are provided. The fixture 88 is turnably mounted to the seat post 71. The clamping of the battery 2 may be configured such that the battery 2 is clamped with the band 89 by turning the fixture 88 in one direction and is released from the band 89 by turning the fixture 88 in the opposed direction. A power supply part 90 is mounted to the bottom of the battery holder 87, and a power is supplied from the battery 2 to the motor-assisted drive unit 86 via the power supply part 90.

Figure 8:
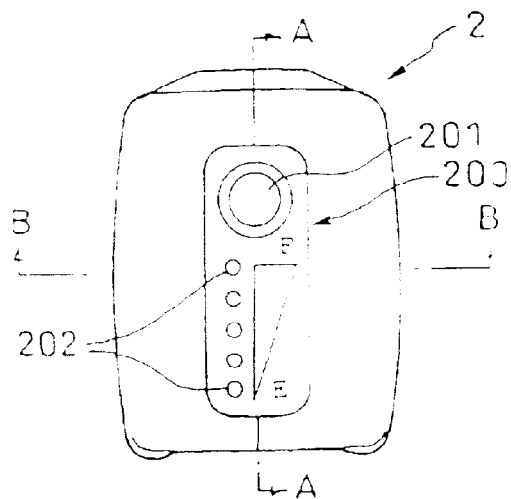
FIG. 8 is a top view of the battery.
Figure 9:
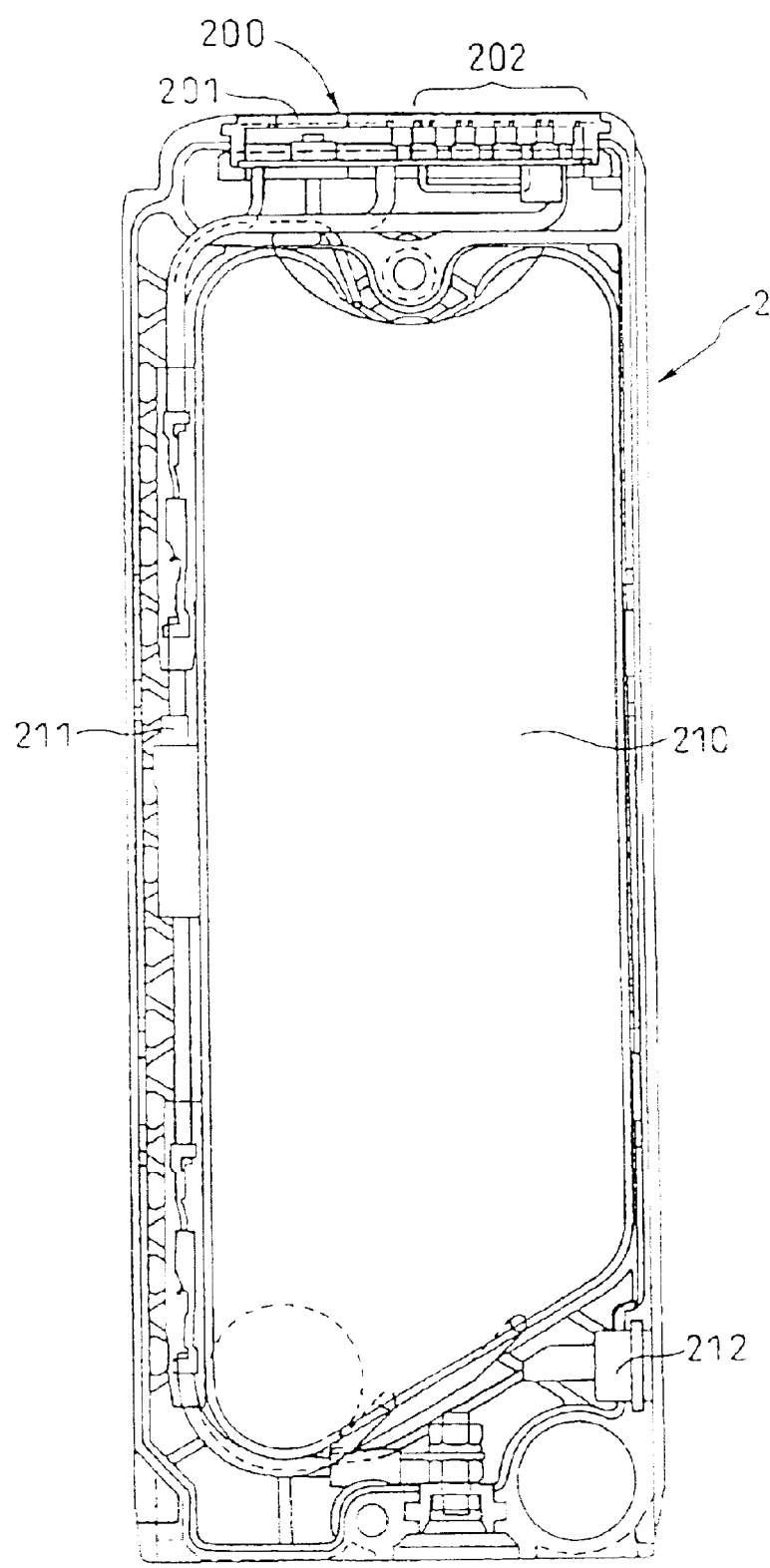
FIG. 9 is a sectional view taken on line A—A of FIG. 8.
Figure 10:
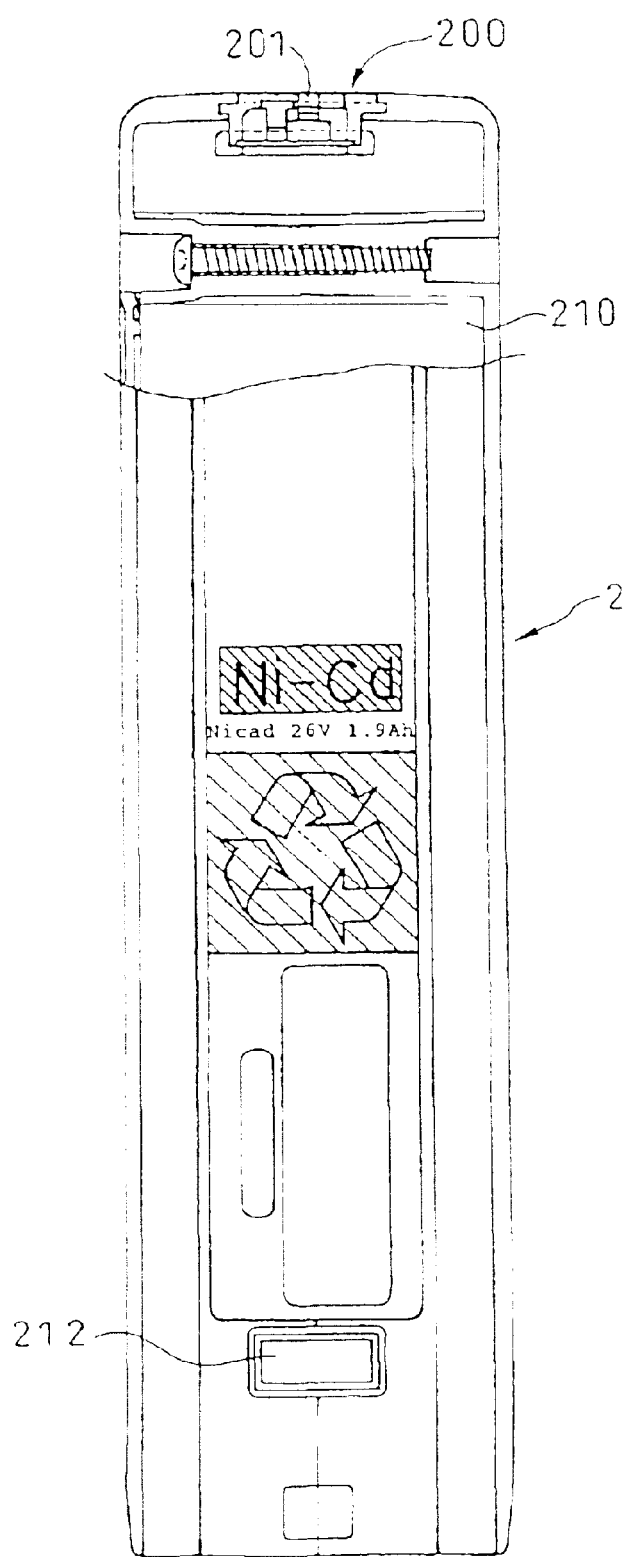
FIG. 10 is a side view, with a portion cutaway along line B—B of FIG. 8, of the battery.

One configuration of the battery 2 will be described with reference to FIGS. 8 to 10. FIG. 8 is a top view of the battery; FIG. 9 is a sectional view taken on line A—A of FIG. 8; and FIG. 10 is a side view, with a portion cut away along line B—B of FIG. 8.

A battery residual amount meter 200 including an operational switch 201 and five light emitting diodes 202 is provided on the upper surface of the battery 2. When the operational switch 201 is depressed by a driver, the battery residual mount is displayed by lighting of the light emitting diodes 202. If the residual amount of the battery is sufficient, the five light emitting diodes 202 are all turned on, and as the residual amount of the battery becomes small, the light emitting diodes are turned off one by one in the arrangement order from top to bottom. A wire is laid out from the upper to the lower portion of a battery main body 210 along the outer side surface of the battery main body 210. A fuse 211 is inserted at a midpoint of the wire and a charging coupler 212 is connected to the lower end of the wire. FIG. 10 shows a side surface of the battery on the seat post 71 side. When the battery 2 is inserted in a battery holder 87, the charging coupler 212 faces to the side surface of the battery 2 on the seat post 71 side.

Figure 5:
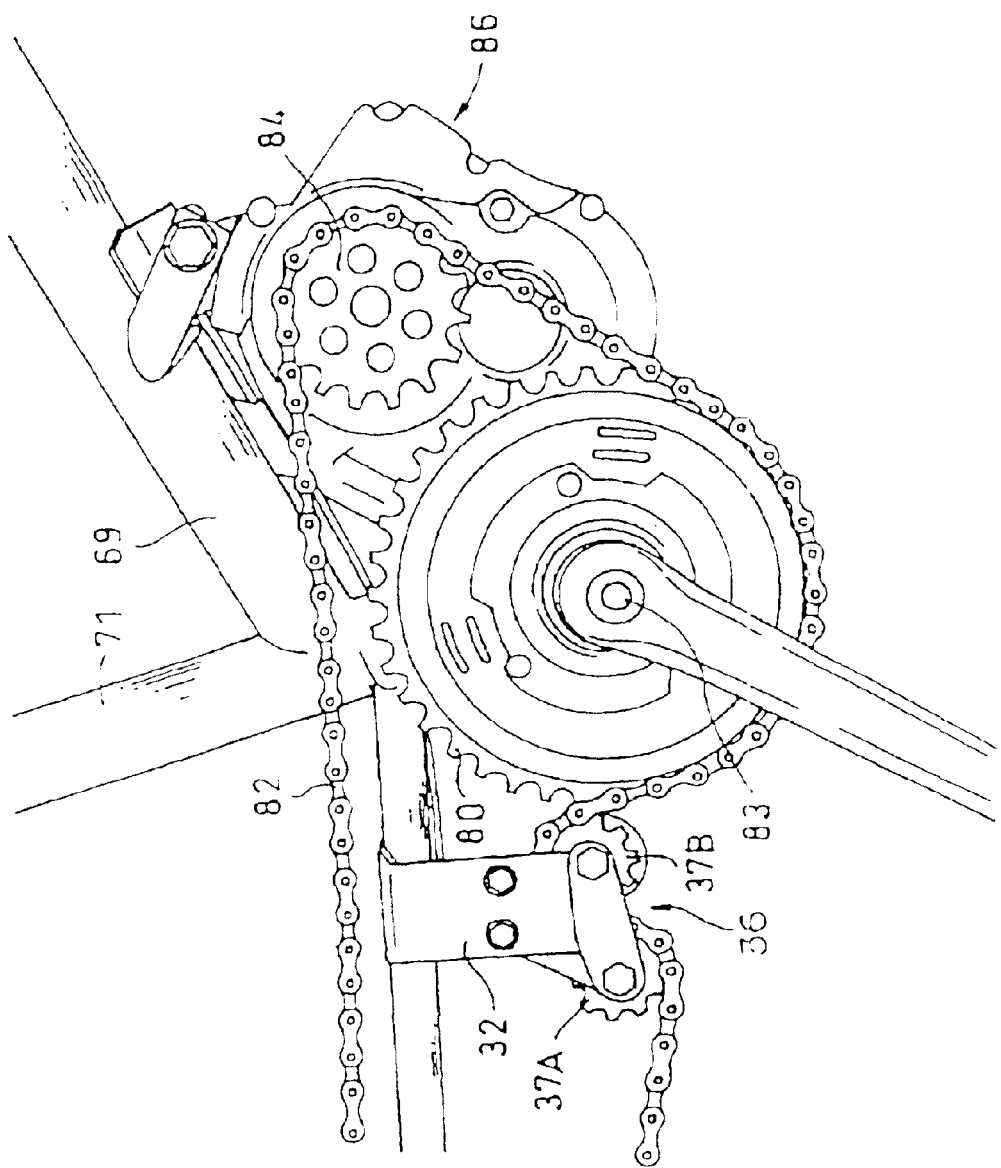
FIG. 5 is a side view of a crank shaft of the motor-assisted vehicle.

FIG. 5 is a side view showing the area around the crank shaft 83 with the chain cover 91 removed. In addition, a tensioner 36 shown in FIG. 5 is different from the tensioner 36 shown in FIG. 4. As shown in FIG. 5, the tensioner 36 includes two small sprockets 37A and 37B supported by the lower end of a bracket 32 fixed to one leg of the rear fork 70. The tension of the chain 82 can be set at a suitable value by adjusting the mounting angle of the small sprockets 37A and 37B to the bracket 32.

Figure 6:
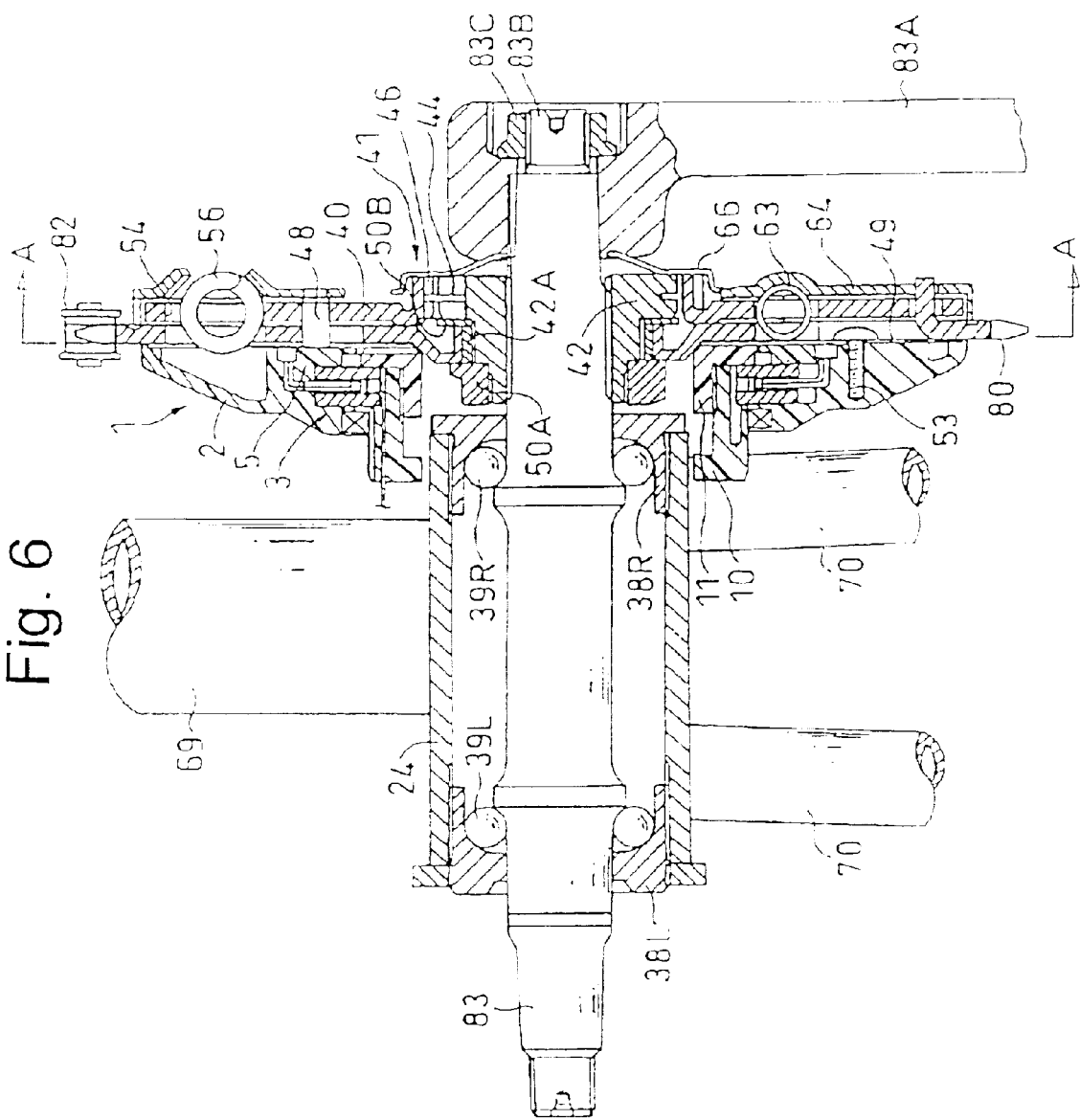
FIG. 6 is a sectional view of the motor-assisted vehicle in which the leg-power detector is assembled.
Figure 7:
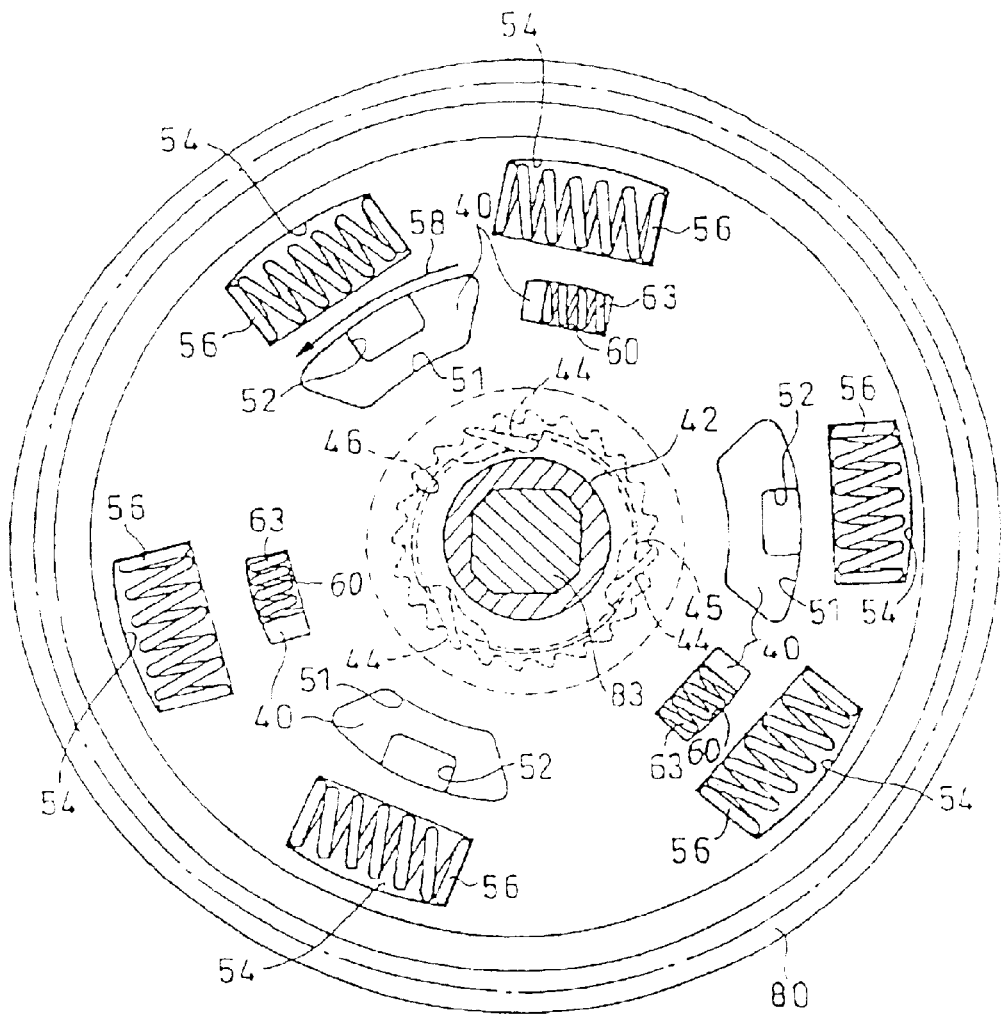
FIG. 7 is a sectional view taken on line A—A of FIG. 6.

A manual drive unit mounted to the crank shaft 83 will be described below. FIG. 6 is a sectional view showing the crank shaft 83 and its surrounding area, and FIG. 7 is a sectional view taken on line A—A of FIG. 6. Caps 38L and 38R are screwed in both ends of a supporting pipe 24 fixed to the down pipe 69. Ball bearings 39L and 39R are inserted between the caps 38L and 38R and stepped portions of the crank shaft 83, respectively. The ball bearings 39L and 39R act to rotatably support the crank shaft 83 while receiving thrust and radial loads applied to the crank shaft 83.

Cranks 83A are provided on the right and left ends of the crank shaft 83. It should be noted that only the right crank 83A is shown in FIG. 6. The crank 83A is fixed to the right end of the crank shaft 83 by screwing a nut 83C around a bolt 83B formed on the right end of the crank shaft 83. An inner ring 42 of a one-way clutch 41 is fixed on the crank shaft 83 at a position between the crank 83A and the supporting pipe 24. The drive sprocket 80 is turnably supported on the outer periphery of the inner ring 42 via a bush 42A. Both the ends of the drive sprocket 80 in the thrust direction are restricted by a nut 50A and a plate 50B.

A cover body 64 is integrally provided on the drive sprocket 80, and a transmission plate 40 is disposed in a space surrounded by the drive sprocket 80 and the cover body 64. The transmission plate 40 is supported so as to be coaxial with the drive sprocket 80. As will be described in detail, a predetermined offset is permitted between the transmission plate 40 and the drive sprocket 80 in the rotational direction centered at the crank shaft 83.

Referring to FIG. 7, a plurality of (six in this embodiment) windows 54 are provided so as to lie astride both the drive sprocket 80 and transmission plate 40. A compression coil spring 56 is provided in each of the windows 54. When a rotational offset occurs between the drive sprocket 80 and the transmission plate 40, the compression coil spring 56 generates a force against the rotational offset.

Ratchet teeth 46 as the outer ring of the one-way clutch 41 are formed on the inner periphery of the transmission plate 40. The ratchet teeth 46 are engaged with ratchet claws 44 supported by the inner ring 42 and biased in the radial direction by a spring 45. A dust-proof cover 66 is provided on the one-way clutch 41.

The transmission plate 40 has locking holes 52 in which projections 48 (to be described in detail later) for transmitting the leg-power are to be locked. The drive sprocket 80 has windows 51 for allowing the projections 48 to be locked in the locking holes 52. The projections 48 pass through the windows 51 and are locked in the locking windows 52.

A plurality of (three in this embodiment) small windows 60 are provided so as to lie astride both the drive sprocket 80 and the transmission plate 40. A compression coil spring 63 is provided in each of the small windows 60, which spring acts to bias the transmission plate 40 on the rotational direction 58 side. To be more specific, the compression coil spring 63 acts in the direction of absorbing the loosening between the drive sprocket 80 and the transmission plate 40, thereby allowing the displacement of the transmission plate 40 to be transmitted to the drive sprocket 80 with good responsiveness.

A sensor portion 1 of a leg-power detector is mounted on a portion of the drive sprocket 80 near the vehicular body on the down pipe 69 side of the drive sprocket 80. The sensor portion 1 has an outer ring 2 fixed to the drive sprocket 80, and a sensor main body 3, rotatably provided on the outer ring 2, for forming a magnetic circuit.

The outer ring 2 is made from an electrically insulating material, and is fixed to the drive sprocket 80 with a bolt (not shown). A cover 49 is provided on a portion, on the drive sprocket 80 side, of the outer ring 2, and is fixed to the outer ring 2 with a set screw 53.

Figure 1:
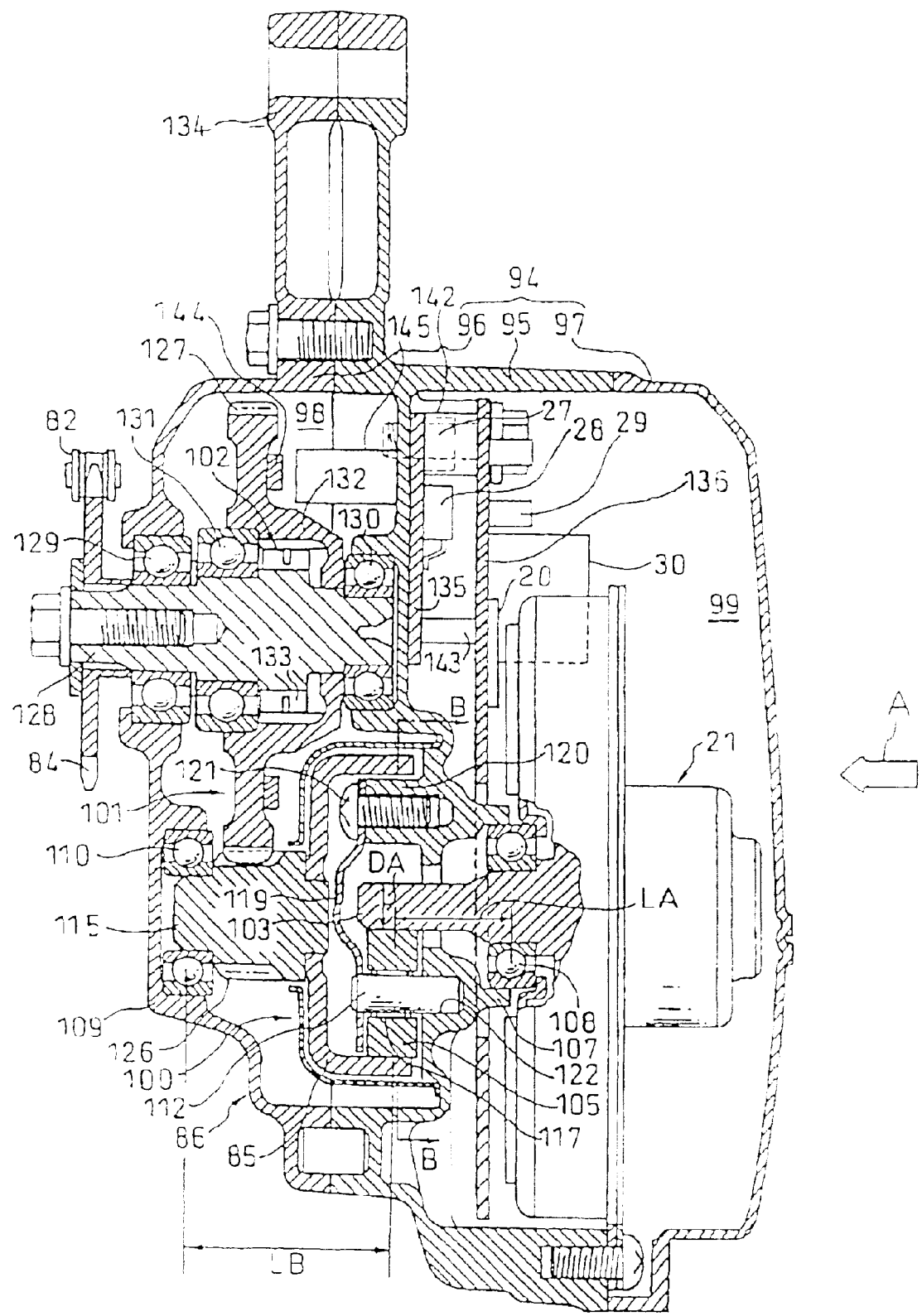
FIG. 1 is a sectional view of a motor-assisted drive unit according to one embodiment of the present invention.
Figure 2:
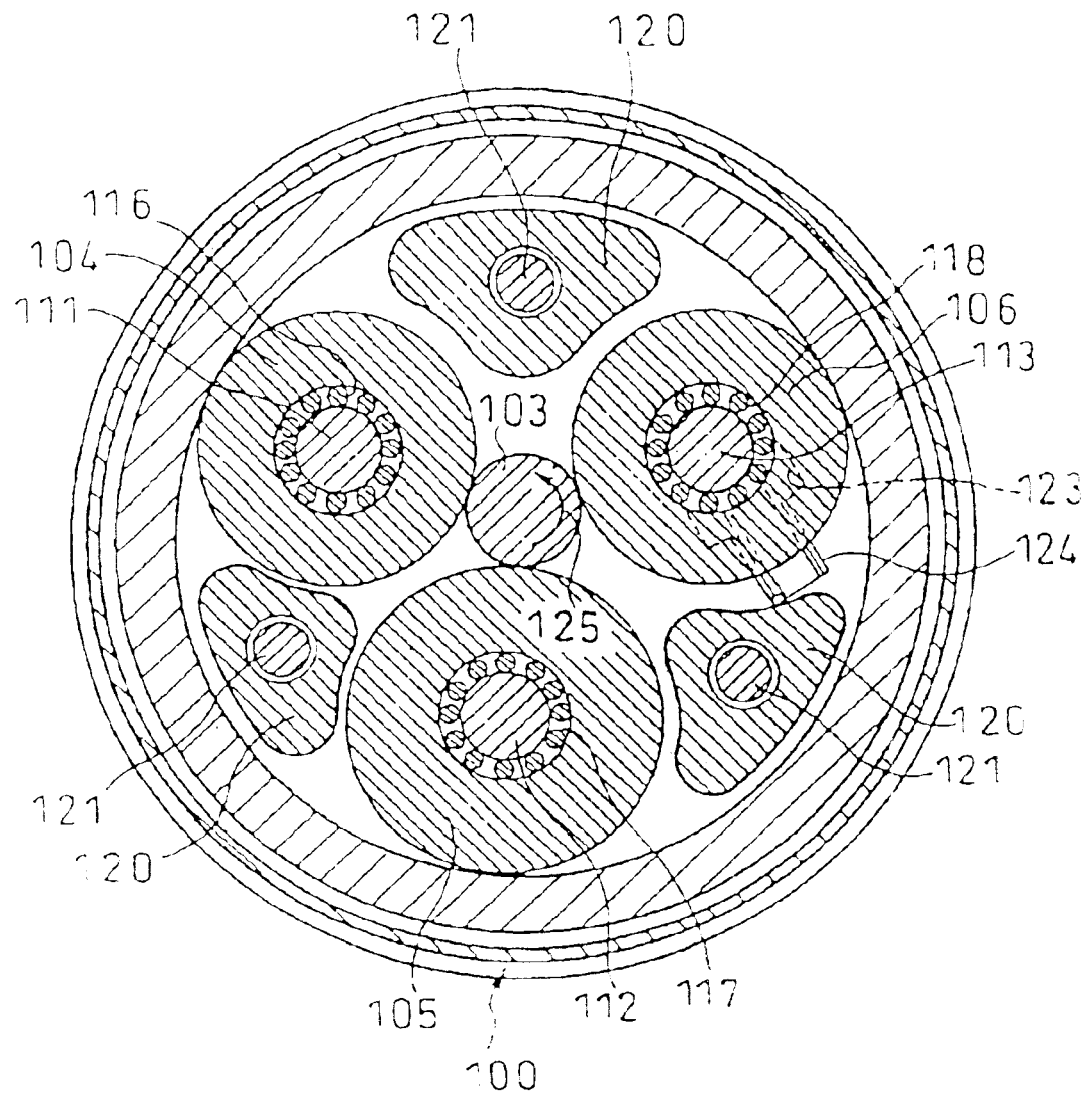
FIG. 2 is a sectional view taken on line B—B of FIG. 1.
Figure 3:
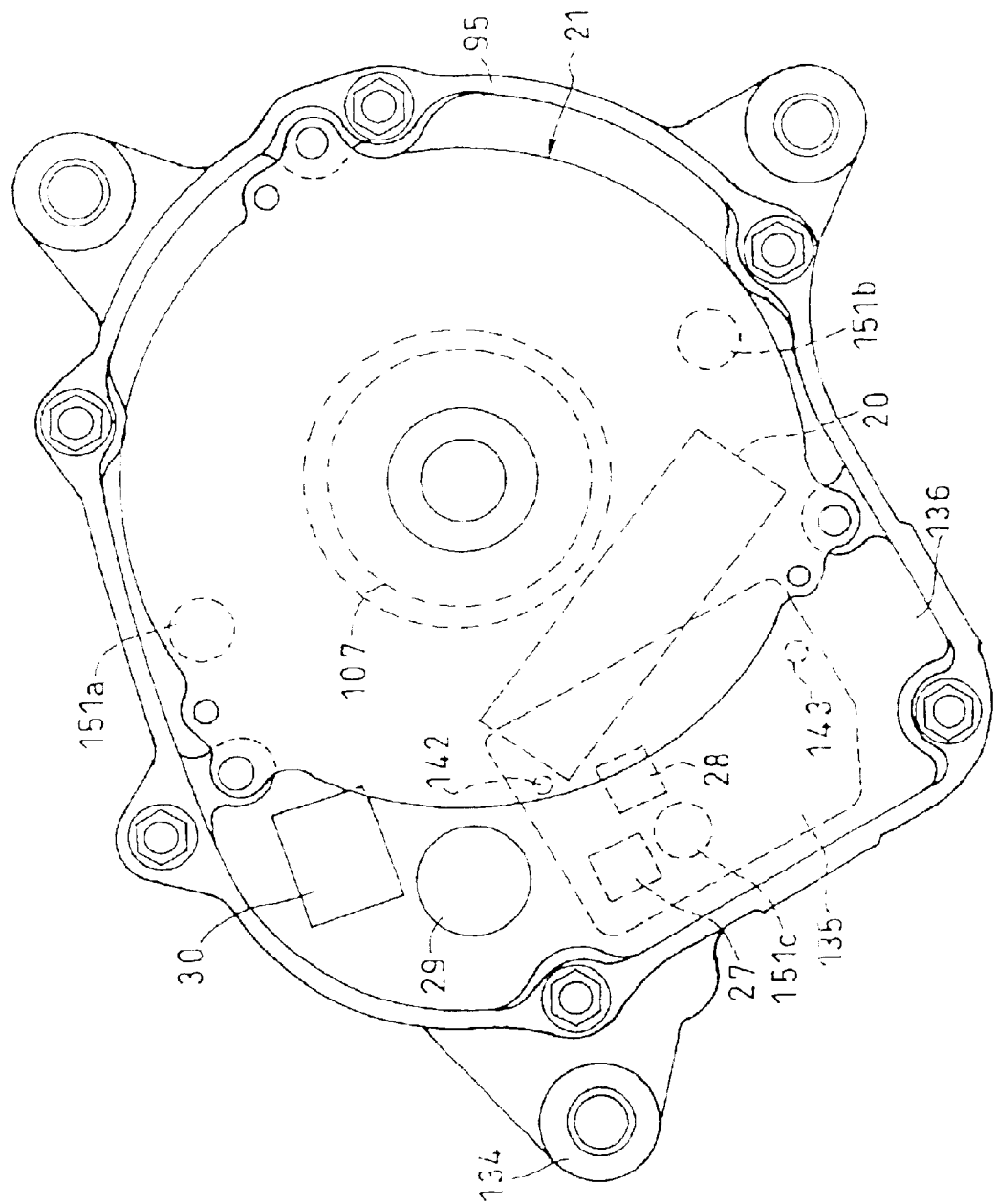
FIG. 3 is a view, seen along the axial direction A, of a drive motor shown in FIG. 1, with a cover removed.

FIG. 1 is a sectional view of the motor-assisted drive unit 86; FIG. 2 is a sectional view taken on line B—B of FIG. 1; and FIG. 3 is a view, seen along the axial direction (direction A), of a drive motor 21 in a state in which a cover 97 is removed from the unit 86 shown in FIG. 1.

Referring to FIG. 1, a casing 94 of the motor-assisted drive unit 86 includes a first casing half 95 a second casing half 96, connected to the first casing half 95, for forming a first housing 98 between the first casing half 95 and the second casing half 96; and a cover 97, connected to the first casing half 95, for forming a second housing 99 between the first casing half 95 and the cover 97.

The drive motor 21 having a shaft parallel to the crank shaft 83 is housed in the second housing 99, and is fixedly supported by the first casing half 95. The output from the drive motor 2 is transmitted to the drive (motor-assisted) sprocket 84 via a roller type speed reducer 100, a reduction gear train 101, and a second one-way clutch 102 in order to assist the leg-power applied to the pedals 79.

Referring particularly to FIG. 2, the roller type speed reducer 100 includes a motor shaft 103 of the drive motor 21; a bowl type outer ring 85 surrounding the motor shaft 103; and a plurality of (three, in this embodiment) reduction rollers 104, 105 and 106 allowed to roll in contact with the outer surface of the motor shaft 103 and the inner surface of the outer ring 85. The roller type speed reducer 100 functions to silently reduce the assisting power from the drive motor 21 and transmit the reduced power to the reduction gear train 101 side.

The motor shaft 103 is rotatably supported, via a ball bearing 108, by a cylindrical first bearing portion 107 provided in the first casing half 95 so as to project from the second housing 99 into the first housing 98 side. The outer ring 85 is disposed in the first housing 98 so as to surround the end portion, projecting in the first housing 98, of the motor shaft 103, and a base end portion of an output shaft 115 is coaxially fixed to the central portion of the closed end of the outer ring 85. A cylindrical second bearing portion 109 corresponding to the leading end of the output shaft 115 is provided in the second casing half 96. The leading end of the output shaft 115 is rotatably supported by the second bearing portion 109 via the ball bearing 110.

The reduction rollers 104, 105 and 106 are rotatably supported by roller shafts. 111, 112 and 113 via needle bearings 116, 117 and 118, respectively. One end of each of the roller shafts 111, 112, and 113 is supported by the first casing half 95, and the other end thereof is supported by a supporting plate 119. The supporting plate 119 is fastened, by means of screw members 121, on bosses 120 integrally provided on the first casing half 95 so as to be each located between the reduction rollers 104, 105, and 106.

Of the reduction rollers 104, 105 and 106, each of the reduction rollers 104 and 105 is supported by the left side first casing half 95 and the supporting plate 119 so that the position thereof along the circumferential direction of the motor shaft 103 is fixed. A fitting hole 122 with its bottom closed, to which one end of each of the roller shafts 111 and 112 of the reduction rollers 104 and 105 is fitted, is provided in the first casing half 95.

Of the reduction rollers 104, 105 and 106, the reduction roller 106 is supported by the first casing half 95 and the supporting plate 119 so that the position thereof in the circumferential direction of the motor shaft 103 is changeable within a specific restricted range so that the reduction roller 106 projects into the portion between the motor shaft 103 and the outer ring 85 by frictional engagement with the motor shaft 103 upon rotation of the motor shaft 103.

A fitting hole 123 with its bottom closed, to which one end of the roller shaft 113 of the reduction roller 106 is to be fitted, is provided in the first casing half 95. A spring 124 for biasing a pin (not shown) pressing the roller shaft 113 is provided in the fitting hole 123. The reduction roller 106 is biased by the spring 124 in the direction in which it projects into the portion between the motor shaft 103 and the outer ring 85.

Of the reduction rollers 104, 105 and 106, the reduction rollers 104 and 106 have the same outside diameter, while the reduction roller 105 has an outside diameter larger than that of the reduction rollers 104 and 106. The axial line of the output shaft 115 is eccentric from that of the motor shaft 103.

With this roller type speed reducer 120, when the motor shaft 103 is rotated in the direction 125 shown in FIG. 2 in accordance with the operation of the drive motor 21, the reduction roller 106 projects into the portion between the motor shaft 103 and the outer ring 85, thereby functioning as a wedge therebetween. As a result, the contact surface pressure of each of the reduction rollers 104, 105 and 106 between the motor shaft 103 and the outer ring 85 is increased, so that the output torque from the drive motor 21 is transmitted from the motor shaft 103 to the output shaft 115 via the reduction rollers 104, 105 and 106 and the outer ring 85. In this case, the motor shaft 103 is restricted in the three directions by the reduction rollers 104, 105 and 106 surrounding the motor shaft 103, and thereby a force proportional to the drive torque of the drive motor 21 acts between each of the reduction rollers 104, 105 and 106 and the motor shaft 103. As a result, it is possible to damp vibration generated from the drive motor 21 by the roller type speed reducer 100.

The reduction gear train 101 includes a drive gear 126 as a power transmission portion and a driven gear 127 meshed with the drive gear 126. The drive gear 126 is integrally provided to the output shaft 115 at a position between the second bearing portion 109 of the second casing half 96 and the outer ring 85.

In the roller type speed reducer 100, the motor shaft 103 is supported by the first bearing portion 107 of the first casing half 95 via the ball bearing 108, and the output shaft 115 is supported in a cantilever manner by the second bearing portion 109 of the second casing half 96 via the ball bearing 110. In this case, a length LA from the center of the ball bearing 108 and the axial center of each of the reduction rollers 104, 105 and 106 is set to be twice or more as large as an outer diameter DA of a contact portion, with each of the reduction rollers 104, 105 and 106, of the motor shaft 103 (LA>DA'2); and a length LB from the axial center of each of the reduction rollers 104, 105 and 106 and the axial center of the ball bearing 110 is set to be one-half or more as large as an inside diameter DB of the outer ring 85 (LB>DB×½).

With this dimensional setting, the supporting length of the motor shaft 113 from the ball bearing 108 and the cantilever supporting length of the output shaft 115 from the ball bearing 110 are suitably set, respectively so that even if the assembling accuracy of the motor shaft 103 with each of the reduction rollers 104, 105 and 106 of the roller type speed reducer 100 is relatively roughly set, the effect of such setting is minimized at the meshed portion of the driven gear 127 with the drive gear 126 of the output shaft 115.

The driven gear 127 of the reduction gear train 101 is disposed so as to coaxially surround a rotation drive shaft 128. The rotation drive shaft 128 is rotatably supported by the second casing half 96 via a ball bearing 129, and also rotatably supported by the first casing half 95 via a ball bearing 130. The drive sprocket 84 is fixed to an end portion, projecting from the second casing half 96, of the rotation drive shaft 128.

A ball bearing 131 and a second one-way clutch 102 are provided between the rotation drive shaft 128 and the driven gear 127. The second one-way clutch 102 has a clutch outer ring 132 integrally provided on the driven gear 127, and a clutch inner ring 133 integrally provided on the rotation drive shaft 128. The second one-way clutch 102 has the same structure as that of the first one-way clutch 41. The second one-way clutch 102 permits, as the drive motor 21 is operated, the transmission of a torque generated by the drive motor 21 and reduced by the roller type speed reducer 100 and the reduction gear train 101 to the rotation drive shaft 128, that is, the drive sprocket 84; but permits, when the operation of the drive motor 21 is stopped, idling of the rotation drive shaft 109 in order not to obstruct the rotation of the drive sprocket 69 due to the leg-power applied to the pedals 79. A hanger portion 134 formed on the casing 94 is fastened to the bracket 93 fixed to the down pipe 69.

Referring particularly to FIG. 3, a control unit for controlling the operation of the drive motor 21 is housed in the second housing 99 on the left (in FIG. 3), rear side from the drive shaft 21. The control unit has a second control board 136 mounted on the inner wall of the first casing half 95 by means of mounting members 151a, 151b, and 151c, and a first control board 135 mounted on the first casing half 95 with a gap between the second control board 136 and the first control board 135. The first control board 135 is overlapped with a portion of the second control board 136. The gap between the first and second control boards 135 and 136 is established by collars 142 and 143 in which bolts are inserted.

The second control board 136, which is preferably configured as a printed wiring board, has an area extending from the inner peripheral wall of the first casing half 95 to the periphery of the first bearing portion 107. In other words, the second control board 136 has an area extending to a position at which it is overlapped with the motor 21, as seen from the axial direction A of the drive motor 21. Control devices such as a CPU 20, a capacitor 29, and relay 30 are mounted on the second control board 136. In order to effectively use a space on the second control board 136, the CPU having a low height and a large area is disposed in the gap between a portion, overlapped with the drive motor 21, of the second control board 13 6 and the drive motor 21.

The first control board 135, which may be configured as a light metal board having a good thermal conductivity, such as aluminum, is directly attached on the inner wall surface of the first casing half 95. Devices such as a FET 27 and a diode 28 are mounted on the first control board 135 while being put between the second control board 136 and the first control board 135. The heat generated from these devices are transferred to the first casing half 95 via the first control board 135. Accordingly, it is possible to effectively prevent the above devices from being heated to high temperatures.

The first control board 136, which is preferably considered as a printed wiring board, has an area extending from the inner peripheral wall of the first casing half 95 to the periphery of the first bearing portion 107. In other words, the second control board 136 has an area extending to a position at which it is overlapped with the motor 21, as seen from the axial direction A of the drive motor 21. Control devices such as a CPU 20, a capacitor 29, and relay 30 are mounted on the second control board 136. In order to effectively use a space on the second control board 136, the CPU having a low height and a large area is disposed in the gap between a portion, overlapped with the drive motor 21, of the second control board 136 and the drive motor 21.

Figure 11:
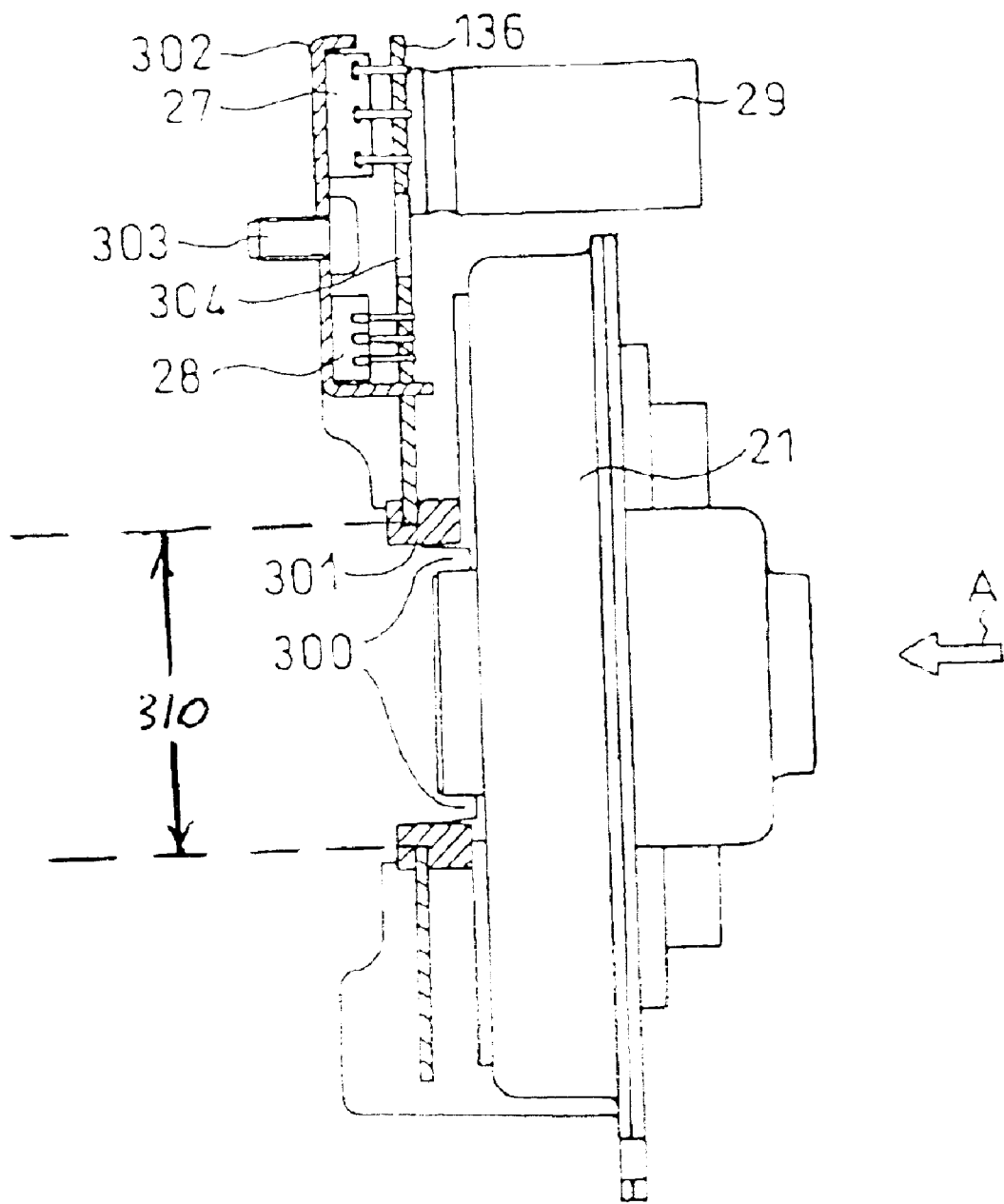
FIG. 11 is a partial sectional side view of a motor portion according to an alternative motor-assisted drive unit of the present invention.
Figure 12:
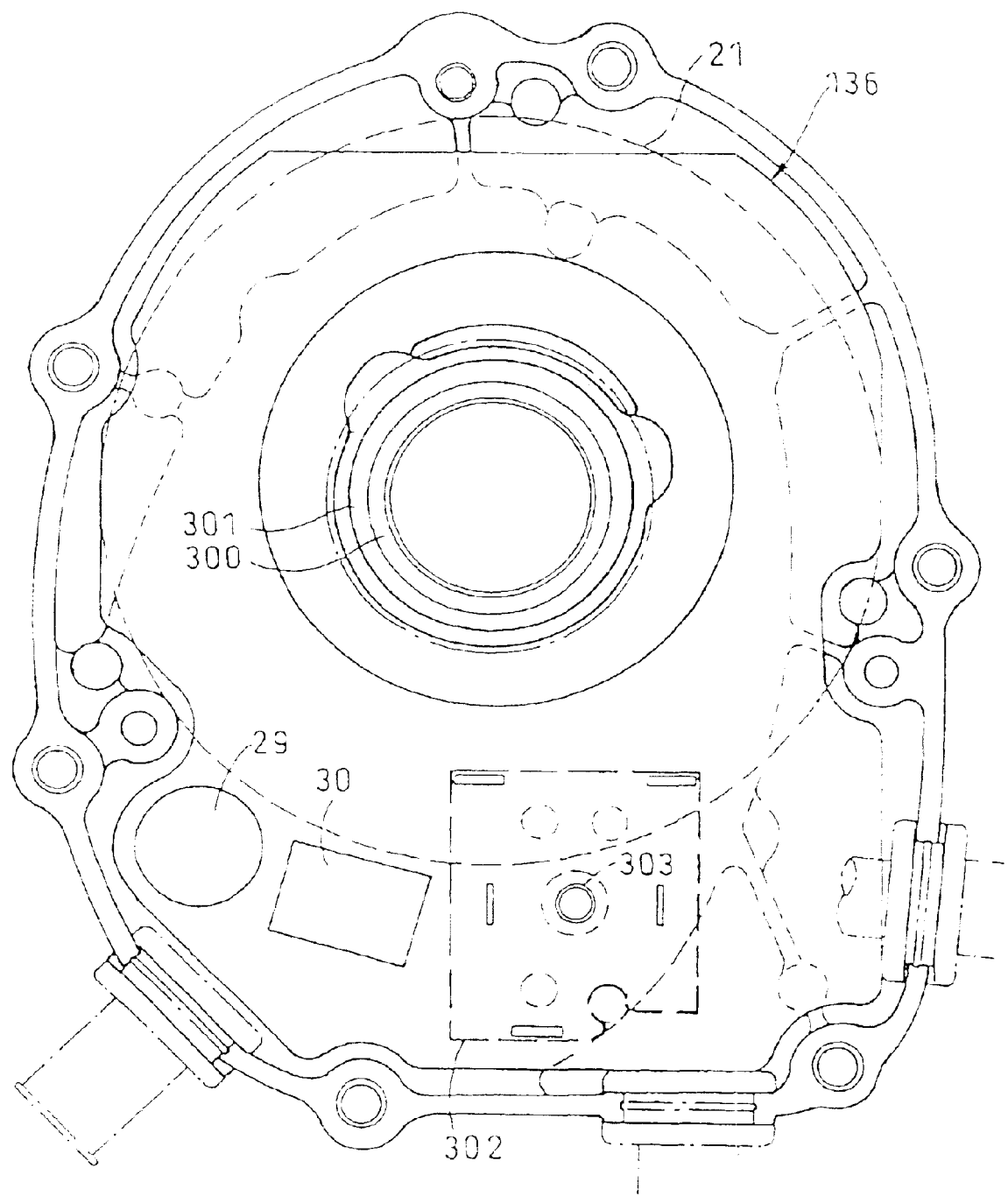
FIG. 12 is a view, seen along the direction A, of the motor portion shown in FIG. 11, with the motor is removed.

Another configuration example of the control unit will be described with reference to FIGS. 11 and 12. FIG. 11 is a partial sectional side view of a motor 21 portion and the surrounding motor-assisted drive unit, and FIG. 12 is a view, seen along the direction A, of the motor 21 portion and its surrounding area shown in FIG. 11, with the motor 21 removed.

A second control board 136, such as a printed wiring board, is disposed on a plane behind the motor 21 and perpendicular to the motor shaft as seen along the direction A of FIG. 11, so as to be near the motor 21. The second control board 136 has a circular hole 310 centered at the motor shaft, and a motor shaft supporting portion 300 as a case boss portion having a circular cross-section inserted in the circular hole 310. An annular vibration-proof rubber ring 301 is mounted between the inner periphery of the circular hole and the outer periphery of the motor shaft supporting portion 300 in a state being elastically compressed therebetween.

As in the exemplary embodiments in FIGS. 1 and 3, the capacitor 29, relay 30, and the like are mounted on the surface of a portion, not overlapped with the motor 21, of the second control board 136, and a part having a low height and a relatively large area, such as the CPU 20 (not shown), is mounted on the surface of a portion, overlapped with the motor 21, of the second control board 136. A first control board 302, which may be a light metal board having good thermal conductivity, for example, an aluminum board, is supported on the back surface of a portion of the second control board 136 so as to be overlapped thereto.

A central portion of the first control board 302 is mounted to the inner wall surface of the first casing half 95 (see FIG. 1) with a screw 303. An insertion hole 304 in which a tool for turning the screw 303 is to be inserted is formed in the first control board 136 at a position facing to the screw 303.

The devices such as the FET 27 and diode 28 are mounted on the back surface of the second control board 136 so as to be located in a space between the first control board 302 and the second control board 136. The upper surfaces of these devices are in contact with the first control board 302. Accordingly, the heat generated from the devices such as the FET 27 and the diode 28 is transferred to the first casing half 95 via the first control board 302; therefore, these devices can be effectively prevented from being heated to high temperatures.

Referring back to FIG. 1 and the embodiment described initially, a speed sensor 145 for sensing a magnetic body 144 provided on the driven gear 127 for detecting the rotational speed of the driven gear 127 is mounted on the back surface, opposite to the aluminum board 135, of the first casing half 95.

When the pedals 79 are manually actuated in the drive direction, the inner ring 42 fixed to the clutch shaft 83 is rotated, and the rotation is transmitted to the ratchet teeth 46 via the ratchet claws 44. The rotation of the transmission plate 40 is transmitted to the drive sprocket 80 via the compression coil springs 56, however, since a load is applied to the drive sprocket 80, the rotation of the transmission plate 40 is not immediately transmitted to the drive sprocket 80. The compression coil springs 56 are first deflected depending on the load applied thereto, and when the deflection of the compression coil springs 56 is balanced against the load, the drive sprocket 80 is rotated. In this way, the transmission plate 40 and the drive sprocket 80 are rotated while being offset from each other in the rotational direction depending on the load, to provide a drive force to the rear wheel via the chain 82. The load applied to the drive sprocket 80 is detected as a force generated when the pedals 79 are actuated by a driver, that is, leg-power.

Since the projection 48 projecting from the sensor portion 1 of the leg-power detector is rotated together with the transmission plate 40, the positional relationship between the leg-power transmission ring (inner ring) 5 supporting the projection 48 and the outer ring 2 fixed to the drive sprocket 80 is determined depending on the leg-power. The positional relationship is detected by the sensor portion 1, and is supplied to a control unit (not shown) for detecting the leg-power.

When the pedals 79 are actuated in the direction reversed to the drive direction, or when the actuation of the pedals 79 is stopped during running of the vehicle, the engagement between the ratchet claws 44 and the ratchet teeth 46 is released, and accordingly, the drive sprocket 80 is not rotated, or during running, the drive sprocket 80 is rotated independently from the crank shaft 83.

As described above, according to this embodiment, since the board on which the control devices of the motor are mounted is, as seen along the axial direction of the motor, disposed so as to extend in the direction perpendicular to the motor shaft and to be partially overlapped with the motor, it is possible to eliminate the need of housing the control board in a casing projecting downwardly from a motor casing as the conventional drive unit, and hence to reduce the size of the motor-assisted drive unit. Further, since the second control board is overlapped with the first control board, as seen along the axial direction of the motor, it is possible to further miniaturize the motor-assisted drive unit.

As described above, since the board on which the control devices of the motor are mounted is, as seen along the axial direction of the motor, disposed so as to extend in the direction perpendicular to the motor shaft and to be partially overlapped with the motor, it is possible to make the size of the motor-assisted drive unit as small as possible.

Since the control board on which the control devices of the motor are mounted extends, as seen along the axial direction of the motor, to a position at which it is overlapped with the motor, it is possible to dispose the control board having a large area in the casing, and to effectively use the inner space of the casing.

It is also possible to dispose the CPU having a relatively large mounting area in a space behind the motor, which has been dead space in conventional devices, and hence to increase the degree of freedom in arrangement of the control devices to be mounted on the control board, other than the CPU.

Since the second control board is overlapped with part of the first control board, the size of the motor-assisted drive unit can be farther reduced. Further, control devices mounted on the first and second control boards can be efficiently disposed in consideration of the correlation between the control devices, and the first and second control boards can be disposed in the casing without having a dead space.

Since the control devices having small heat generation, such as the CPU, capacitor, and relay, and the FET, which has a high heat generation, are mounted on boards separate from each other, it is possible to prevent the heat generated from the FET from being directly transferred to the CPU, capacitor, and relay.

According to the invention, it is possible to efficiently transfer the heat, which is generated from the FET and the like mounted on the second control board, to the casing via the light metal board, and since the first control board is disposed over the second control board with a gap disposed therebetween, it is possible to limit the first control board's exposure to heat.

The transmission of vibration during running of the vehicle to the control board is retarded which stabilizes the operation of the electric parts mounted on the control board, thereby prolonging the service life of the electric parts.

According to the invention, it is possible to effectively transfer heat generated from the semiconductor device by a simple, inexpensive structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A motor-assisted drive unit for a motor-assisted vehicle, comprising:
   a motor for providing power to a drive wheel of the vehicle;
   a first control board having at least one control device mounted thereon; and
   a second control board having at least one control device mounted thereon, wherein the first and second control boards extend in a direction substantially perpendicular to a motor shaft of the motor, said second control board having a surface larger than a surface of the first control board and entirely overlapping the first control board, said first control board having a first region overlapped with said motor, and a second region not overlapped with said motor.

2. The motor-assisted drive unit of claim 1, the motor and the first and the second control boards being disposed in a casing.

3. The motor-assisted drive unit of claim 1, wherein the at least one control device mounted on the second control board includes at least one of a control processor, a capacitor, and a relay.

4. The motor-assisted drive unit of claim 3, wherein the at least one control device mounted on the first control board includes transistor.

5. The motor-assisted drive unit of claim 3, wherein the second control board is a printed wiring board, and the first control board is a metal board.

6. The motor-assisted drive unit of claim 5, wherein the first control board includes aluminum.

7. The motor-assisted drive unit of claim 1, the motor and the first and the second control boards being disposed in the casing, the first control board having a substantially flat surface facing away from the motor, the flat surface being directly attached to an inner wall surface of the casing, and the second control board being disposed over the first control board, with a gap disposed between the first control board and the second control board.

8. The motor-assisted drive unit of claim 1, wherein the second control board is elastically supported in a casing of the motor by a circular rubber ring fitted into a circular hole of the control board.

9. A motor-assisted drive unit for a vehicle, comprising:

a motor disposed in a casing having a shaft for providing power to a drive wheel of the vehicle; and a first control board on which control devices of said motor are mounted, the first control board being arranged substantially perpendicularly to the shaft of said motor, the first control board having a substantially flat surface facing away from said motor, the flat surface being directly attached to an inner wall of the casing, at least part of the first control board extending to a position overlapped with said motor, said first control board having a first region overlapped with said motor, and a second region not overlapped with said motor; and a second control board having a first region overlapped with said motor, a second region not overlapped with said motor, and a processing unit mounted on a first region of the second control board, said processing unit being one of the control devices.

10. A motor-assisted drive unit for a vehicle, comprising:

a motor disposed in a casing having a shaft for providing power to a drive wheel of the vehicle; and a first control board on which control devices of said motor are mounted, the first control board being arranged substantially perpendicularly to the shaft of said motor, the first control board having a substantially flat surface facing away from said motor, the flat surface being directly attached to an inner wall of the casing, at least part of the first control board extending to a position overlapped with said motor, said first control board having a first region overlapped with said motor, and a second region not overlapped with said motor; and a second control board having a first region overlapped with said motor, a second region not overlapped with said motor, and a processing unit mounted on a first region of the second control board, said processing unit being one of the control devices, wherein an area of the first region of the first control board overlapped with said motor is smaller than an area of the second region not overlapped with said motor.

11. The motor-assisted drive unit of claim 10, wherein a second control board is elastically supported in the casing.

12. The motor-assisted drive unit of claim 11, wherein the second control board is elastically supported by an annular rubber member disposed around a casing boss portion of the motor shaft.

13. The motor-assisted drive unit of claim 12, wherein the rubber member is compressed between the second control board and a motor supporting portion of the casing.

14. The motor-assisted drive unit of claim 10, further comprising:

a thermally conductive board provided on a casing side of the first control board; and a semiconductor device mounted on said thermally conductive board, wherein the control devices of said motor are mounted on two surfaces of the control board.

15. The motor-assisted drive unit of claim 14, wherein at least part of the thermally conductive board abuts the semiconductor device.

16. The motor-assisted drive unit of claim 15, wherein at least a part of the thermally conductive board is in contact with the casing.

17. A motor-assisted drive unit for a vehicle, comprising:

a motor disposed in a casing having a shaft for providing power to a drive wheel of the vehicle; and a first control board on which control devices of said motor are mounted, the first control board being arranged substantially perpendicularly to the shaft of said motor, the first control board having a substantially flat surface facing away from said motor, the flat surface being directly attached to an inner wall of the casing, at least part of the first control board extending to a position overlapped with said motor, said first control board having a first region overlapped with said motor, and a second region not overlapped with said motor, wherein the a second control board is elastically supported in a casing of the motor by a circular rubber ring fitted into a circular hole of the control board.

18. A motor-assisted drive unit for a motor-assisted vehicle, comprising:

a motor for providing power to a drive wheel of the vehicle;

a first control board having at least one control device mounted thereon; and a second control board having at least one control device mounted thereon, wherein the first and second control boards extend in a direction substantially perpendicular to a motor shaft of the motor, said second control board overlapping with at least a part of the first control board, said first control board having a first region overlapped ith said motor, and a second region not overlapped with said motor, wherein one of the at least one control device on each of the control boards is mounted so as not to overlap with the motor.

* * * * *